United States Patent Office 3,498,976
Patented Mar. 3, 1970

3,498,976
N-CARBAMYL AND THIOCARBAMYL-1,2-DIPHEN-YL-2-PROPIONOXY-4-METHYLAMINOBUTANES
Frank H. Clarke, Jr., Armonk, and Fred B. Block, Hartsdale, N.Y., assignors to Geigy Chemical Corporation, Ardsley, N.Y., a corporation of New York
No Drawing. Filed Apr. 10, 1967, Ser. No. 629,385
Int. Cl. C07d 87/46, 29/36; C07c 47/07
U.S. Cl. 260—247.2                      9 Claims

ABSTRACT OF THE DISCLOSURE

N-carbamyl- and N-thiocarbamyl - 1,2-dipenyl - 2-propionoxy-3-methyl-4-methylaminobutanes are neutral analgesics and are obtained from the corresponding 4-(N-monomethyl) butanes through the action of carbamyl chloride, thiocarbamyl chloride, isocyanate or thioisocyanate or from the corresponding 4-(N-cayno-N-methyl)-butanes through the action of hydrogen peroxide or hydrogen peroxide or hydrogen sulfide.

DETAILED DESCRIPTION

The present invention relates to novel organic compounds and to processes for their preparation. In particular the present invention relates to compounds of the formula:

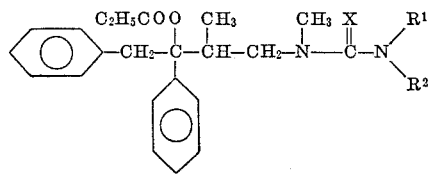

(I)

wherein X is oxygen or sulfur and each of $R^1$ and $R^2$ taken independently is hydrogen or (lower) alkyl and $R^1$ and $R^2$ taken together with the nitrogen to which they are attached are morpholino, piperidino or pyrrolidino.

The foregoing N-carbamyl- and N-thiocarbamyl-1,2-diphenyl - 2-propionoxy-3-methyl-4-methylaminobutanes demonstrates analgesic properties with little or no addiction liability and are thus useful for the treatment of pain such as is encountered in postoperative, postpartum and traumatic conditions, arthritis, cephalalia, bursitis and the like. They may be administered alone, or in combination with other agents such as aspirin, phenacetin, caffeine and the like, in suitable pharmaceutical formulations such as tablets, capsules, suspensions, suppositories and the like.

In the context of this specification and the claims, the term "alkyl" and derivations thereof containing the root "alk," such as alkylene, alkanoyl and the like, represent a hydrocarbon chain of up to thirty carbon atoms, or a group containing such a chain. When qualified by the designation "lower" such chains will contain from one to six carbon atoms, inclusively. It is to be understood that when the functional groups of derivations of alkyl implicitly require more than one carbon atom, such as the double bond in "alkenyl," there will be at least two carbon atoms present.

The compounds of the present invention are prepared via treatment of a compound of the formula:

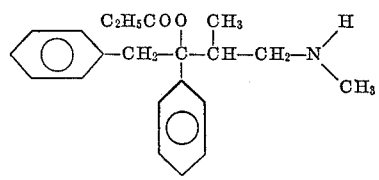

(II)

with a carbamyl chloride or thiocarbamyl chloride in an inert solvent such as benzene or chloroform. In place of the carbamyl chloride or thiocarbamyl chloride, there may be an amine, including ammonia, and phosgene or thiophosgene may be employed.

Alternatively, the compounds of Formula II are treated with an isocyanate or thioisocyanate, or with a salt thereof, to yield the compounds of Formula I wherein at least one of $R^1$ and $R^2$ is hydrogen.

Those compounds of Formula I wherein X is oxygen may be converted to those wherein X is sulfur via the action of phosphorus pentasulfide. Those compounds of Formula I wherein X is sulfur may be converted to those wherein X is oxygen via the action of mercuric oxide.

Alternatively the compounds of the present invention wherein both $R^1$ and $R^2$ are hydrogen are obtained via the action of hydrogen peroxide in the presence of base or aqueous acid or the action of hydrogen sulfide and the corresponding N-cyano derivative to yield the N-carbamyl or N-thiocarbamyl compounds respectively. In the course of this reaction the propionoxy group may be hydrolysed and the resulting free hydroxy group is then reacylated with propionic anhydride. The requisite N-cyano derivatives are obtained from the corresponding known N-dimethyl compounds through the action of cyanogen bromide.

The following examples will serve to further typify the nature of the present invention.

EXAMPLE 1

To a solution of 3.91 mmoles of 1,2-diphenyl-2-propionoxy-3-methyl-4-methylaminobutane in 40 ml. of dimethylformamide and 0.75 g. of sodium bicarbonate under anhydrous conditions is added dropwise a solution of 0.42 g. (3.91 mmoles) of dimethylcarbamyl chloride in 20 ml. dimethylformamide. The mixture is refluxed for 16 hours, filtered and concentrated in vacuo. The residue is recrystallized several times from cyclohexane: ethyl acetate to yield N-dimethylcarbamyl-1,2-diphenyl-2-propionoxy-3-methyl-4-methylaminobutane.

EXAMPLE 2

To a solution of 7.16 mmoles of 1,2-diphenyl-2-propionoxy-3-methyl-4-methylaminobutane in 50 ml. of chloroform is added 0.76 g. of sodium bicarbonate and 1.28 g. (8.6 mmoles) of 4-morpholinocarbonyl chloride. The mixture is refluxed for four hours, filtered and concentrated in vacuo. The residue is recrystallized from benzene:cyclohexane:ethyl acetate to yieul N-morpholinocarbonyl - 1,2 - diphenyl - 2 - propionoxy-3-methyl-4-methylaminobutane.

By employing piperidinocarbonyl chloride and pyrrolidinocarbonyl chloride there are respectively obtained N-piperidinocarbonyl - 1,2-diphenyl-2-propionoxy-3-methyl-4-methylaminobutane and N-pyrrolidinocarbonyl-1,2-diphenyl-2-propionoxy-3-methyl-4-methylaminobutane.

EXAMPLE 3

To a solution of 1.54 mmoles of 1,2-diphenyl-2-propionoxy-3-methyl-4-methylaminobutane in 25 ml. glacial acetic acid is added 1.24 g. of potassium isocyanate. The resulting solution is heated 10 minutes on a steam bath, then diluted with 100 ml. of water and rendered basic with 50% sodium hydroxide solution. The mixture is extracted with chloroform and the chloroform phase washed with water and dried. Evaporation of the dried chloroform extracts and trituration with benzene yields N-carbamyl-1,2-diphenyl-2-propionoxy - 3 - methyl - 4 - methylaminobutane.

EXAMPLE 4

To a mixture of 0.72 mmole of 1,2-diphenyl-2-propionoxy-3-methyl-4-methylaminobutane, 1.85 g. of sodium bicarbonate and 50 ml. of anhydrous benzene are added 17 ml. of 12.5% phosgene in benzene. After refluxing for 1½ hours the solution is cooled, filtered and concentrated in vacuo. The residue is treated with 8 ml. of 4.3% of alcoholic ammonia solution at 95° C. for 16 hours in a pressure bottle. After evaporation, the resulting residue is taken up in chlorofrom and washed with water. The dried chlorofrom solution upon evaporation yields N-carbamyl-1,2-diphenyl-2-propionoxy-3-methyl - 4 - methylaminobutane which is recrystallized from benzene.

EXAMPLE 5

A solution of 0.38 mmole of 1,2-diphenyl-2-propionoxy-3-methyl-4-methylaminobutane and 0.3 g. of methyl isothiocyanate in 70 ml. of anhydrous tetrahydrofuran is refluxed for 18 hours under anhydrous conditions. The solution is concentrated and cooled. Recrystallization of the solid from 1:2 ethyl acetate:cyclohexane yields N-methylthiocarbamyl-1,2-diphenyl-2-propionoxy-3 - methyl-4-methylaminobutane which is recrystallized from methanol.

EXAMPLE 6

A solution of 1.68 mmoles of 1,2-diphenyl-2-propionaxy oxy-3-methyl-4-methylaminobutane, 0.25 g. (2.75 moles) of ethyl isothiocyanate and 60 ml. of anhydrous tetrahydrofuran is refluxed for 3¼ hours. The solution is concentrated in vacuo and the residue recrystallized from methanol to yield N-ethylthiocarbamyl-1,2-diphenyl-2-propionoxy-3-methyl-4-methylaminobutane.

EXAMPLE 7

To a mixture of .031 mole of N-cyano-1,2-diphenyl-2-propionoxy-3-methyl-4-methylaminobutane, 9.7 ml. of 30% hydrogen peroxide and 30% ml. of ethanol are added slowly 5.6 ml. of 6 N equeous sodium hydroxide solution with stirring and external cooling, maintaining the temperature at 35–40°. When addition is complete, the cooling bath is removed and the mixture is stirred at 50–60° for three and one-half hours. The mixture is then cooled and the solid collected.

One and a half grams of this material, 10 ml. of dry pyridine and 1.17 g. of propionic anhydride are briefly heated to bring about solution. The solution is stirred at room temperature overnight and then treated with sufficient 2 N hydrochloric acid to render the solution acidic to Congo red. The mixture is then extracted with chloroform and the extracts dried and concentrated to yield N-carbamyl-1,2-diphenyl-2-propionoxy-3 - methyl-4-methylaminobutane which is recrystallized from ethanol.

The requisite N-cyano compound may be obtained as follows:

To a solution of 2.6 g. of cyanogen bromide in 30 ml. of chloroform is added at room temperature a solution of 2.01 mmoles of 1,2-diphenyl-2-propionoxy-3-methyl-4-dimethylaminobutane in 30 ml. of chloroform over a period of 45 minutes. The solution is refluxed for three hours and then evaporated to dryness in vacuo. The residue is crystallized from ethanol to yield N-cyano-1,2-diphenyl-2-propionoxy-3-methyl-4-methylaminobutane.

EXAMPLE 8

A solution of 9.03 mmoles of N-cyano-1,2-diphenyl-2-propionoxy-3-methyl-4-methylaminobutane, 12.8 ml. triethylamine and 75 ml. pyridine is cooled to —70°. Hydrogen sulfide is introduced over a period of 10 minutes and the solution then allowed to return to room temperature and stand overnight. The solution is then concentrated and the residue heated at reflux with 50 ml. ethanol and 10 ml. of 1 N sodium hydroxide for 2 hours. The pH is adjusted to 6–7 and the solid thus formed is collected, dried and esterified as described in Example 7 to yield N-thiocarbamyl-1,2-diphenyl-2-propionoxy - 3 - methyl - 4-methylaminobutane.

What is claimed is:

1. A compound of the formula:

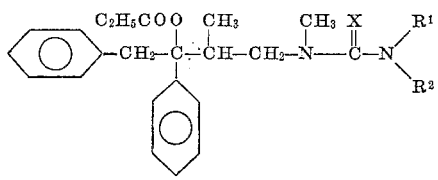

wherein X is oxygen or sulfur and each of $R^1$ and $R^2$ taken independently is hydrogen or (lower) alkyl and $R^1$ and $R^2$ taken together with the nitrogen to which they are attached are morpholino, piperidino or pyrrolidino.

2. The compound according to claim 1 wherein X is oxygen and each of $R^1$ and $R^2$ is methyl.

3. The compound according to claim 1 wherein X is oxygen and $R^1$ and $R^2$ taken together with the nitrogen to which they are attached are morpholino.

4. The compound according to claim 1 wherein X oxygen and $R^1$ and $R^2$ taken together with the nitrogen to which they are attached are piperidino.

5. The compound according to claim 1 wherein X is oxygen and $R^1$ and $R^2$ taken together with the nitrogen to which they are attached are pyrrolidino.

6. The compound according to claim 1 wherein X is oxygen and each of $R^1$ and $R^2$ is hydrogen.

7. The compound according to claim 1 wherein X is sulfur, $R^1$ is hydrogen and $R^2$ is methyl.

8. The compound according to claim 1 wherein X is sulfur, $R^1$ is hydrogen and $R^2$ is ethyl.

9. The compound according to claim 1 wherein X is sulfur and each of $R^1$ and $R^2$ is hydrogen.

References Cited

UNITED STATES PATENTS 2,477,872   8/1949   Haury _____ 260—552

ALEX MAZEL, Primary Examiner

ANNE MARIE T. TIGHE, Assistant Examiner

U.S. Cl. X.R.

260—247.1, 293.4, 294.3, 326.3, 490; 424—232, 248, 267, 274, 311

GC 269

PO-1050
(5/69)

UNITED STATES PATENT OFFICE
CERTIFICATE OF CORRECTION

Patent No. __3,498,976__     Dated __March 3, 1970__

Inventor(s) __Frank H. Clarke Jr. and Fred B. Block__

It is certified that error appears in the above-identified patent and that said Letters Patent are hereby corrected as shown below:

Col 1, line 13 - "1,2-dipenyl" should be -- 1,2-diphenyl --

Col 1, line 18 - "N-cayno-" should be --N-cyano--

Col. 1, line 19 - "hydrogen peroxide or" should be omitted

Col. 3, line 24 "propionaxy" should be -- propion- --

Col. 3, line 25 - "moles)" should be --m moles) --

Col. 3, line 35 - second occurrence of "30%" should be -- 30 --

Col. 3, line 36 - "equeous" should be -- aqueous --

SIGNED AND
SEALED
AUG 11 1970

(SEAL)
Attest:

Edward M. Fletcher, Jr.
Attesting Officer

WILLIAM E. SCHUYLER, JR.
Commissioner of Patents